United States Patent
Choi et al.

(10) Patent No.: US 9,831,543 B2
(45) Date of Patent: Nov. 28, 2017

(54) ADAPTABLE ANTENNA APPARATUS FOR BASE STATION

(71) Applicant: Samsung Electronics Co., Ltd., Suwon-si, Gyeonggi-do (KR)

(72) Inventors: Ji-Hyeon Choi, Suwon-si (KR); Han-Seok Kim, Seoul (KR); Kyu-Il Yeon, Hwaseong-si (KR); Byung-Tae Yoon, Suwon-si (KR); Jun-Sung Lee, Guri-si (KR); Nam-Ryul Jeon, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 14/612,655

(22) Filed: Feb. 3, 2015

(65) Prior Publication Data

US 2015/0222013 A1 Aug. 6, 2015

(30) Foreign Application Priority Data

Feb. 4, 2014 (KR) .................. 10-2014-0012781

(51) Int. Cl.
*H01Q 21/00* (2006.01)
*H01Q 1/24* (2006.01)
*H01Q 3/01* (2006.01)
*H01Q 21/29* (2006.01)
*H04B 7/02* (2017.01)

(52) U.S. Cl.
CPC .............. *H01Q 1/246* (2013.01); *H01Q 3/01* (2013.01); *H01Q 21/293* (2013.01); *H04B 7/02* (2013.01)

(58) Field of Classification Search
CPC .......... H01Q 1/1242; H01Q 7/00; H01Q 7/02; H01Q 1/08; H01Q 1/1235; H01Q 1/24
USPC .................... 343/879, 880, 839, 869, 871
See application file for complete search history.

(56) References Cited

U.S. PATENT DOCUMENTS

| | | |
|---|---|---|
| 2003/0189514 A1 | 10/2003 | Miyano et al. |
| 2008/0150800 A1 | 6/2008 | Tsuji |
| 2008/0174508 A1 | 7/2008 | Iwai et al. |
| 2009/0267835 A1* | 10/2009 | Tietjen ................. H01Q 1/084 342/368 |
| 2009/0295637 A1 | 12/2009 | Tong et al. |
| 2010/0060523 A1 | 3/2010 | Yamazaki et al. |
| 2010/0164784 A1 | 7/2010 | Longstaff |
| 2010/0321265 A1 | 12/2010 | Yamaguchi et al. |
| 2011/0063158 A1 | 3/2011 | Kondou |

(Continued)

OTHER PUBLICATIONS

Choe et al., Foldable Multifunctional Planar Antenna Array, Proceedings of APMC 2012, Dec. 4-7, 2012, pp. 1097-1099, Kaohsiung, Taiwan.

(Continued)

*Primary Examiner* — Dameon E Levi
*Assistant Examiner* — Collin Dawkins
(74) *Attorney, Agent, or Firm* — Jefferson IP Law, LLP (57) ABSTRACT

An adaptable antenna apparatus for a base station is provided. The adaptable antenna apparatus includes a first antenna having a first antenna array, a second antenna rotatably coupled to the first antenna and having a second antenna array, and a main controller provided in one of the first antenna and the second antenna, wherein the main controller is configured to apply a control signal to the first antenna and the second antenna.

15 Claims, 5 Drawing Sheets

(56) References Cited

U.S. PATENT DOCUMENTS

2012/0280874 A1* 11/2012 Kim .................. H01Q 1/246
 343/763
2012/0319746 A1 12/2012 Hayashi et al.
2013/0127377 A1* 5/2013 Zhao .................. H02P 31/00
 318/5

OTHER PUBLICATIONS

Kelley et al., Array Antenna Pattern Modeling Methods That Include Mutual Coupling Effects, IEEE Transactions on Antennas and Propagation, Dec. 1993, pp. 1625-1632, vol. 41.

* cited by examiner

ADAPTABLE ANTENNA APPARATUS FOR BASE STATION

CROSS-REFERENCE TO RELATED APPLICATION(S)

This application claims the benefit under 35 U.S.C. §119(a) of a Korean patent application filed on Feb. 4, 2014 in the Korean Intellectual Property Office and assigned Serial number 10-2014-0012781, the entire disclosure of which is hereby incorporated by reference.

TECHNICAL FIELD

The present disclosure relates to an antenna apparatus and an internal structure thereof. More particularly, the present disclosure relates to an adaptable antenna apparatus for a base station installed on an outer wall, in a pole, which can vary the form or structure thereof according to an area in which the base station is installed and an internal structure thereof.

BACKGROUND

In general, in a wireless communication network, such as a mobile communication network, a Wireless Local Loop (WLL), and the like, a base station is installed between a switch center and a subscriber terminal, and wireless signals are exchanged between the base station and the subscriber terminal Thereafter, an antenna for converting electrical signals to electromagnetic waves or vice versa to exchange wireless signals with terminals is installed in the base station, and the antenna is designed to have a certain vertical/horizontal radiation pattern based on a spatial distribution of subscriber calls.

More particularly, a base station of a mobile communication network refers to a system for relaying electric waves of a portable terminal in a cell. The base station is generally installed on a roof of a building to relay electric waves of a portable terminal. Accordingly, base stations are present in a unit of cells, and the base stations control the transmission of signals, designation of a communication channel, and the monitoring of a communication channel in units of cells, as well as an interface function between the portable terminal and a switch center. The antenna apparatuses employed in the base station have been distributed due to an advantage of the presence of many control antennas which may be vertically or horizontally beam-tilted.

In recent years, integral active array antennas in which a base station RF unit is integrally realized with an antenna to remove feeding wires have been newly developed. The Active Array Antenna (AAA) is configured such that an antenna module including an antenna element and a transceiver module coupled to the antenna element are provided in one antenna housing. In general, the antennas are stacked lengthwise in an antenna housing.

A specific beam pattern is formed through a base station, such as an active array antenna, to support a data transmission/reception service. A unique beam pattern may be formed by vertically spacing N antenna elements from each other in an active array antenna. The base station, such as an active array antenna, does not change an initially set antenna gain (dir 16 dBi to 18 dBi). Accordingly, when an antenna apparatus for a base station is installed, it may be up/down tilted mechanically or an antenna element may be set through steering.

As described above, the antenna apparatus for a base station should use initially set characteristics. Furthermore, the settings of the antenna apparatus for a base station cannot be changed according to the geographical features of the area in which the antenna apparatus is disposed, for example, according to whether the area is an urban area in which tall buildings are densely disposed or an outside area, or a distribution of users. For example, the antenna apparatus for a base station cannot reflect the local characteristics and continues to use the initially set form or structure.

Therefore, a need exists for an adaptable antenna apparatus for a base station which can vary the form or structure thereof according to an area in which the base station is installed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an adaptable antenna apparatus for a base station which can vary the form or structure thereof according to an area in which the base station is installed, the features of the area, or the purpose of the adaptable antenna apparatus.

Another aspect of the present disclosure is to provide an adaptable antenna apparatus for a base station which can realize an optimum beam pattern or an optimum antenna gain by adaptably installing the antenna apparatus according to an installation purpose thereof, and a geographical environmental situation of a surrounding area.

Another aspect of the present disclosure is to provide an adaptable antenna apparatus for a base station which can realize a spatial diversity gain without additionally installing an antenna apparatus for a base station by making the antenna apparatus foldable.

In accordance with an aspect of the present disclosure, an adaptable antenna apparatus for a base station is provided. The adaptable antenna apparatus includes a first antenna having a first antenna array, a second antenna rotatably coupled to the first antenna and having a second antenna array, and a main controller provided in one of the first antenna and the second antenna, wherein the main controller applies a control signal to the first antenna and the second antenna.

The antenna apparatus for a base station according an embodiment of the present disclosure can vary the form or structure thereof according to an area in which the base station is installed, the features of the area, or the purpose of the adaptable antenna apparatus.

Furthermore, the adaptable antenna apparatus according to an embodiment of the present disclosure can drive only an antenna module provided with a main controller among a plurality of separated antenna modules according to a necessity when being installed. Accordingly, the number of antennas which have been unnecessarily provided in the related art can be reduced, and thus antenna efficiency of the antenna apparatus for a base station can be improved.

The antenna apparatus for a base station according an embodiment of the present disclosure can realize an optimum beam pattern or an optimum antenna gain by adaptably installing the antenna apparatus according to an installation purpose thereof, and a geographical environmental situation of a surrounding area.

The antenna apparatus for a base station according an embodiment of the present disclosure can realize a spatial diversity gain without additionally installing an antenna apparatus for a base station by making the antenna apparatus foldable.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, in an antenna apparatus for a base station according to various embodiments of the present disclosure, the gravitational direction will be indicated by the Z axis, a first direction perpendicular to the gravitational direction will be indicated by the X axis, and a second direction perpendicular to the gravitational direction and the first direction will be indicated by the Y axis.

Figure 1A:
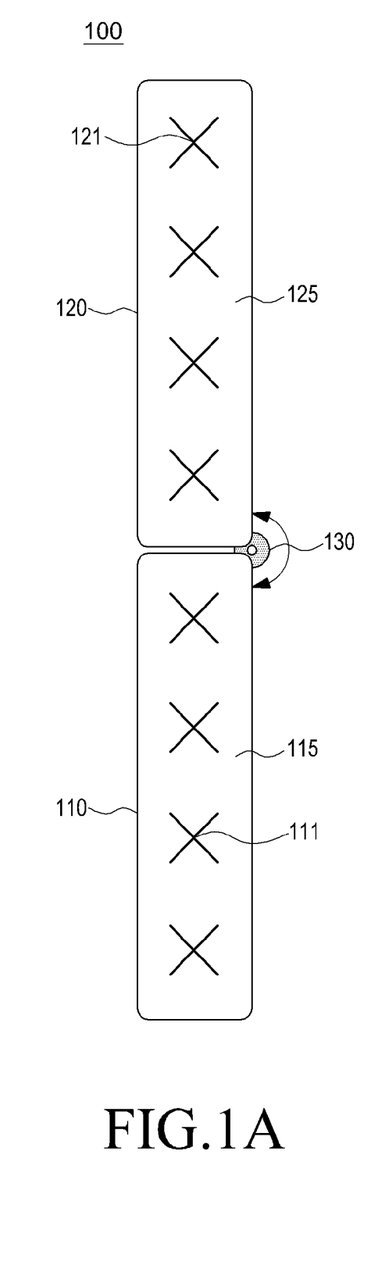
FIGS. 1A and 1B are diagrams illustrating an adaptable antenna apparatus for a base station according to various embodiments of the present disclosure.
Figure 1B:
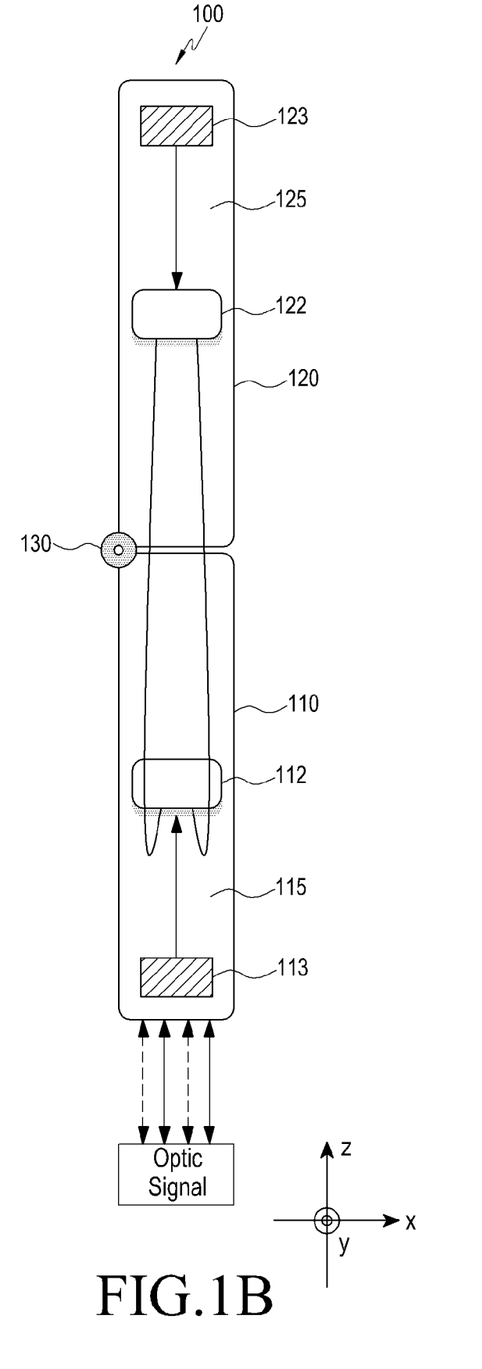
Figure 2:
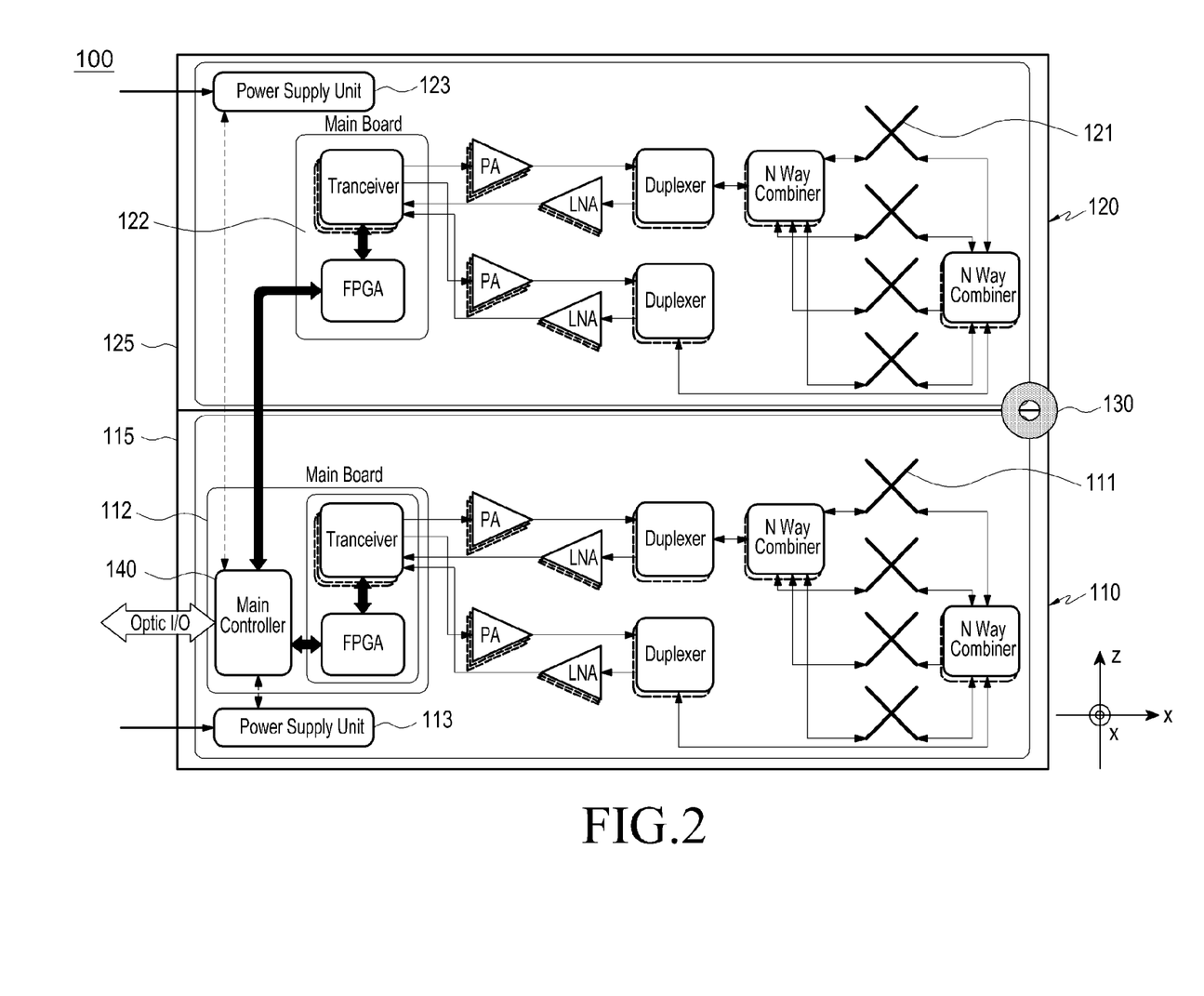
FIG. 2 is a diagram schematically illustrating an internal connection of an adaptable antenna apparatus for a base station according to an embodiment of the present disclosure.

FIGS. 1A and 1B are diagrams illustrating an adaptable antenna apparatus for a base station according to various embodiments of the present disclosure. FIG. 2 is a diagram schematically illustrating an internal connection of an adaptable antenna apparatus for a base station according to an embodiment of the present disclosure.

Referring to FIGS. 1A, 1B, and 2, the adaptable antenna apparatus 100 for a base station according to one of various embodiments of the present disclosure includes a plurality of antennas that are rotatable with respect to each other, and the structures of the antennas may be different according to various environmental factors with which the adaptable antenna apparatus 100 for a base station is mounted. A main controller 140 is provided in one of the plurality of antennas such that the plurality of antennas are controlled by the one main controller 140.

Specifically, the adaptable antenna apparatus 100 for a base station according to an embodiment of the present disclosure may include a first antenna 110, and a second antenna 120 rotatably provided in the first antenna 110, and also may include a main controller 140 provided in at least one of the first and second antennas, for applying a control signal to the first and second antennas. It will be described that the first antenna 110 and the second antenna 120 according to an embodiment of the present disclosure are active array antennas. However, the first and second antennas 110 and 120 are not limited to have a structure of an active array antenna, but their arrays and structures may be variously modified. Furthermore, it will be exemplified in an embodiment of the present disclosure that the main controller 140 is provided in the first antenna 110, but the present disclosure is not limited thereto and the main controller 140 also may be provided in the second antenna 120. It will be also exemplified that the first antenna 110 according to an embodiment of the present disclosure is located below the second antenna 120 and the second antenna 120 is rotated with respect to the first antenna 110. However, the array and dispositions of the antennas may be arbitrarily modified and changed by freely varying the locations of the first antenna 110 and the second antenna 120 and rotating the first antenna 110 with respect to the second antenna 120.

The first antenna 110 may include a first antenna array 111, a first power source 113, a main controller 140, and a first board 112 within one housing (hereinafter, referred to as 'a first antenna housing 115'). Various modules for amplifying a signal transmitted or received to and from the first antenna 110 or amplifying electric power may be provided inside the first antenna housing 115.

The first antenna array 111 may be configured such that a plurality of pairs of transceiver elements (hereinafter, referred to as 'first antenna elements') are provided inside the first antenna housing 115. The first antenna elements may be disposed inside the first antenna housing 115 to be spaced apart from each other by a certain distance in the gravitational direction. It will be exemplified that the first antenna array 111 includes four pairs of transceiver antenna elements. However, the number of the antenna elements provided in the first antenna array 111 may be arbitrarily modified and changed based on antenna radiation patterns.

The first power source 113 is configured to switch on or off a power source of the first antenna 110 by applying electric power to the first board 112, and the first board 112 may include a module for transmitting and receiving data, and also may include a main controller 140 for controlling transmission and reception of data. The first antenna housing 115 may provide various modules for the transmission and reception of signals in addition to the configurations, such as the first antenna array 111, the first power source 113, and the first board 112. For example, the first antenna housing 115 may include a first transceiver module provided in the first board 112, for transmitting and receiving signals, and a first Field Programmable Gate Array (FPGA) for processing transmitted or received signals of the first transmission module. Furthermore, the first antenna housing 115 may include a first Power Amplifier (PA) for amplifying transmitted or received signals, a first Low Noise Amplifier (LNA) for lowering noise when signals are amplified, or a first duplexer.

The second antenna 120 is located on an upper surface of the first antenna 110, and is rotatably coupled to the first antenna 110. The second antenna 120 may be rotatably provided in the first antenna 110 by a hinge 130. The second antenna 120 may be provided in the first antenna 110 to be rotated while taking the X axis as a rotation axis, while taking the Y axis as a rotation axis, or while taking the Z axis as a rotation axis.

The second antenna 120 may include a second antenna array 121, a second power source 123, and a second board 122 inside one housing (hereinafter, referred to as 'a second antenna housing 125') rotatably coupled to an upper portion of the first antenna housing 115 of the first antenna 110. Various modules for amplifying a signal transmitted or received to and from the second antenna 120 or amplifying electric power may be provided inside the second antenna housing 125.

The second antenna array 121 may include a plurality of pairs of transceiver elements (hereinafter, referred to as 'second antenna elements') inside the second antenna housing 125, and the second antenna array 121 may form various beam patterns according to a relative location to the first antenna array 111. It will be exemplified that the second antenna array 121 includes four pairs of transceiver antenna elements. However, the number of the antenna elements provided in the second antenna array 121 may be arbitrarily modified and changed based on antenna radiation patterns.

As described above, the second antenna array 121 may form various beam patterns (BPs) according to a relative location to the first antenna array 111. For example, antenna elements may be located on the same line as that of the second antenna array 121 in the gravitational direction, and may be disposed in a row, that is, in series. In this case, the eight antenna elements may be disposed in a row in the gravitational direction to form one BP. The second antenna array 121 may be disposed in parallel adjacently to a side surface of the first antenna array 111 such that two rows of antenna elements are disposed in the gravitational direction. In this case, four first antenna elements and four second antenna elements are disposed in parallel in two rows in the gravitational direction to form one BP. Furthermore, the BPs by the first antenna array 111 and the second antenna array 121 may be formed according to installation angles of the first antenna 110 and the second antenna 120.

The second power source 123 is configured to switch on or off a power source of the second antenna 120 by applying electric power to the second board 122, and the second bard 122 includes a module for transmitting and receiving data. The second board 122 may be configured such that data are transmitted or received by the main controller 140 disposed in the first antenna 110. The second antenna housing 125 may include various modules for the transmission and reception of signals in addition to the configurations, such as the second antenna array 121, the second power source 123, and the second board 122. For example, the second antenna housing 125 may include a second transceiver module provided in the second board, for transmitting and receiving signals, and a second FPGA for processing transmitted or received signals of the second transceiver module. Furthermore, the second antenna housing 115 may include a second PA for amplifying transmitted or received signals, a second LNA for lowering noise when signals are amplified, or a first duplexer.

The main controller 140 may be provided in any one of the first antenna 110 and the second antenna 120. It will be described in an embodiment of the present disclosure that the main controller 140 is provided in the first antenna 110 located on the relatively lower side. The main controller 140 is configured to apply a control signal to the first antenna 110 and the second antenna 120. The main controller 140 makes a control to synchronize baseband signals for first to fourth modes that are transmitted from a digital unit and will be transmitted again in order to distribute the synchronized baseband signals to both the first antennal 110 and the second antenna 120 or distribute the synchronized baseband signals only to the first antenna 110. In addition to the control, the main controller 140 makes a control to synthesize signals received from the first antenna array 111 and the second antenna array 121 to transmit the synthesized signals to a signal processor.

Electric power is applied to the first antenna 110 provided with the main controller 140 such that the first antenna 110 remains enabled, but the second antenna 120 may be enabled or disabled according to a mounting environment of the adaptable antenna apparatus 100 for a base station. Accordingly, when the adaptable antenna apparatus 100 for a base station is driven, the first antenna 110 provided with the main controller 140 is configured such that electric power is applied to the first power source 113 to enable the first antenna 110. However, the main controller 140 may control application of electric power to the second power source 123 according to an in-use state of the second antenna 120.

The adaptable antenna apparatus 100 for a base station according to an embodiment of the present disclosure may be implemented in four modes of a first mode, a second mode, a third mode, and a fourth mode according to a state in which the second antenna 120 is rotatably disposed in the first antenna 110.

Figure 3A:
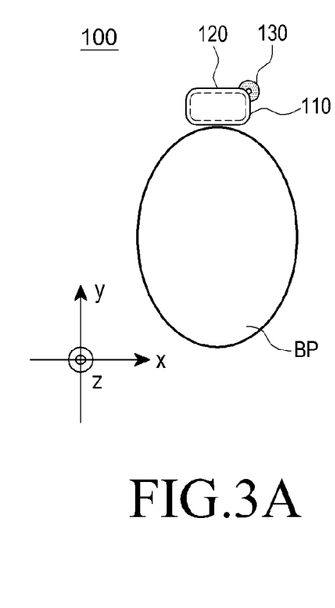
FIGS. 3A and 3B are diagrams schematically illustrating a beam pattern of a first mode of an adaptive antenna apparatus for a base station according to various embodiments of the present disclosure.
Figure 3B:
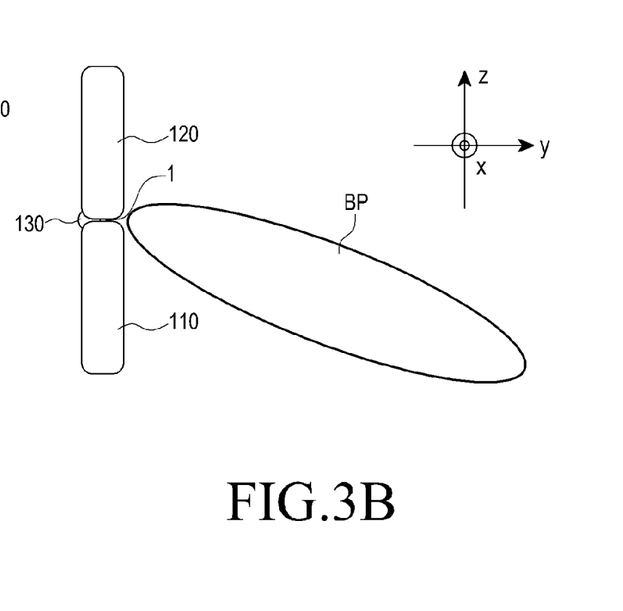

FIGS. 3A and 3B are diagrams schematically illustrating a beam pattern of a first mode of an adaptive antenna apparatus for a base station according to various embodiments of the present disclosure.

Referring to FIGS. 3A and 3B, the first mode corresponds to a state in which the first antenna 110 and the second antenna 120 are unfolded, and the second antenna 120 is disposed lengthwise on the upper surface of the first antenna 110 in the gravitational direction. Because the first antenna 110 and the second antenna 120 are disposed lengthwise in the Z axis, the first antenna array 111 and the second antenna array 121 are disposed in series in a row in the Z axis direction. Specifically, the second antenna elements disposed in the Z axis direction are stacked on the four pairs of first antennas 110 disposed in the Z axis direction to be provided in a row. The first antenna 110 and the second antenna 120 are driven like one antenna. Accordingly, in the first mode, one beam pattern may be formed with reference to a coupling surface between the upper surface of the first antenna 110 and the lower surface of the second antenna 120.

Due to the eight pairs of antenna elements disposed in a row, a half power beam width of the beam pattern BP generated in the first mode may be 30° to 35°. Accordingly, because a beam pattern BP having a half power beam width of 30° to 35° is formed when the first antenna 110 and the second antenna 120 are disposed lengthwise in the gravitational direction, the adaptable antenna apparatus 100 for a base station in the first mode can be installed in a rural area in which buildings rarely interfere with each other, so that signals can be transmitted and received to and from a remote place. For example, when the first antenna 110 and the second antenna 120 are disposed in the first mode, the adaptable antenna apparatus 100 for a base station in the first mode may be installed in a rural area having a small number of buildings as compared with the cities where buildings are densely disposed such that a BP is interfered by the buildings.

Figure 4A:
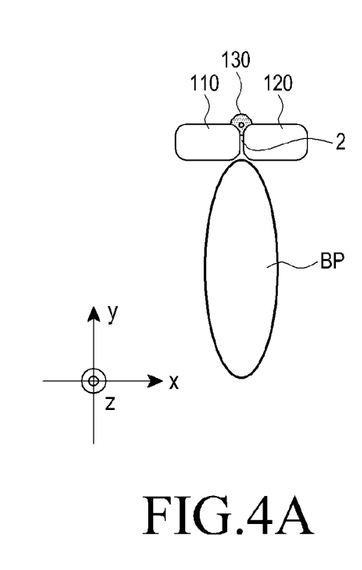
FIGS. 4A and 4B are diagrams schematically illustrating a beam pattern of a second mode of an adaptive antenna apparatus for a base station according to various embodiments of the present disclosure.
Figure 4B:
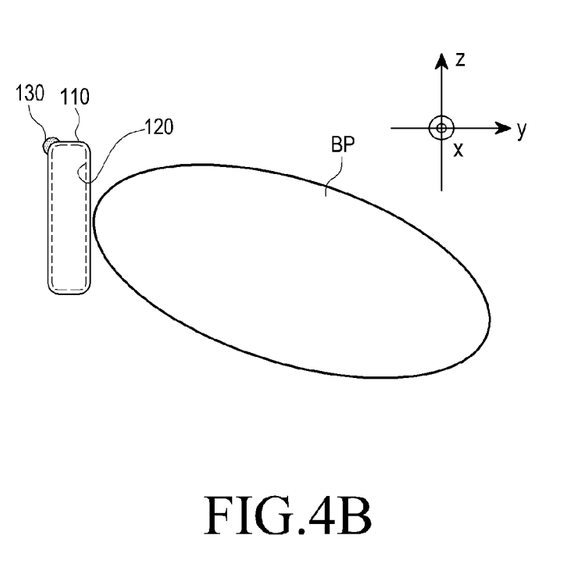

FIGS. 4A and 4B are diagrams schematically illustrating a beam pattern of a second mode of an adaptive antenna apparatus for a base station according to various embodiments of the present disclosure.

Referring to FIGS. 4A and 4B, the first antenna 110 and the second antenna 120 are folded in the second mode. Specifically, in the second mode, the second antenna 120 is rotated with respect to the first antenna 110 while taking the Y axis as a rotation axis, and a side surface of the first antenna 110 is folded onto a side surface of the second antenna 120 and is located adjacently to the side surface of the second antenna 120 to be driven. For example, the side surface of the first antenna 110 and the side surface of the second antenna 120, which form the same side surface while the first antenna 110 and the second antenna 120 are unfolded, are rotated about the hinge 130 such that the first antenna 110 and the second antenna 120 are folded. Accordingly, the first antenna 110 and the second antenna 120 are disposed adjacently to each other in the X axis direction. Because the first antenna 110 and the second antenna 120 are disposed in parallel in the X axis direction, the first antenna array 111 and the second antenna array 121 are also disposed in parallel in the X direction such that two rows of antenna devices are disposed along the Z axis. Specifically, the second antenna elements disposed in the Z axis direction are disposed in parallel to the four pairs of the first antenna elements disposed in the Z axis direction such that two rows are formed.

In addition, as in the first mode, the first antenna 110 and the second antenna 120 may be driven like one antenna in the second mode as in the first mode. In the second mode, one beam pattern BP may be formed with reference to a coupling surface between a side surface of the first antenna 110 and a side surface of the second antenna 120 folded onto the side surface of the first antenna 110. Accordingly, because four pairs of second antenna elements are disposed adjacently to four first antenna elements, the adaptable antenna apparatus 100 for a base station has a two row antenna array. Accordingly, due to the eight antenna elements having a two row array, a half power beam width of a beam pattern BP generated in the second mode may be 60° to 65° and a 2× diversity may be realized due to the two row antenna array. Accordingly, because a beam pattern BP having a half power beam width of 60° to 65° when the first antenna 110 and the second antenna 120 are disposed adjacent to each other in the X axis direction, the first antenna 110 and the second antenna 120 may be used to transmit and receive a signal having a high diversity to and from a nearby area. For example, when the first antenna 110 and the second antenna 120 are disposed in the second mode, the adaptable antenna apparatus 100 for a base station in the second mode may be installed in an urban area where buildings are densely disposed such that a BP is interfered by the buildings rather than the beam pattern BP is transmitted to a relatively remote place.

Figure 5A:
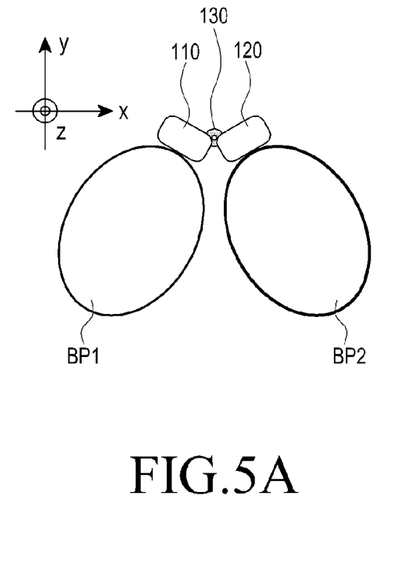
FIGS. 5A and 5B are diagrams schematically illustrating a beam pattern of a third mode of an adaptive antenna apparatus for a base station according to various embodiments of the present disclosure.
Figure 5B:
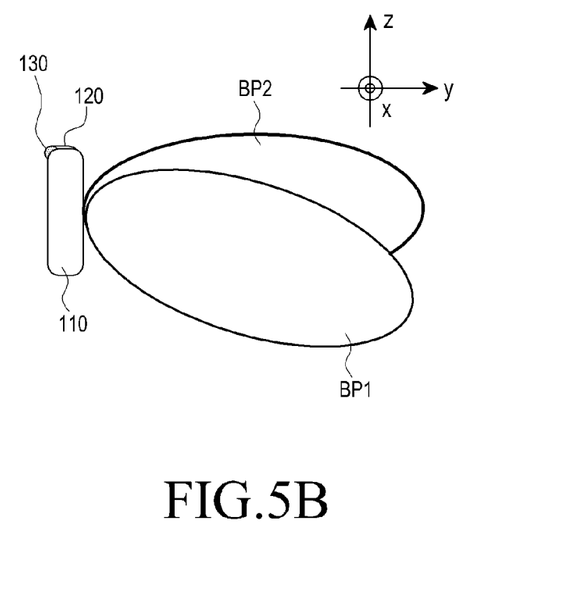

FIGS. 5A and 5B are diagrams schematically illustrating a beam pattern of a third mode of an adaptive antenna apparatus for a base station according to various embodiments of the present disclosure.

Referring to FIGS. 5A and 5B, the third mode corresponds to a horizontal bending mode, and the first antenna 110 in the second mode is tilted to form a certain angle from the second antenna 120. Specifically, in the third mode, first, the first antenna 110 is primarily rotated with respect to the second antenna 120 while taking the Y axis as a rotation axis such that a side surface of the first antenna 110 and a side surface of the second antenna 120 are folded onto each other. In this state, the first antenna 110 and the second antenna 120 are secondarily rotated while tacking the Z axis direction as a rotation axis. Accordingly, a front surface of the first antenna 110 and a front surface of the second antenna 120, or a rear surface of the first antenna 110 and a rear surface of the second antenna 120, are tilted to form a certain angle while facing each other, and the first antenna 110 and the second antenna 120 are provided in the third mode.

In the third mole, the second antenna array 121 is disposed in parallel adjacently to the first antenna array 111, and faces the first antenna array 111 while forming a certain angle therebetween. For example, as in the second mode, the adaptable antenna apparatus 100 for a base station is configured such that four pairs of Z axis direction antennal elements are arranged in two rows in the X axis direction, and because the first antenna 110 and the second antenna 120 are tilted with respect to each other by a certain angle, the first antenna 111 and the second antenna array 121 form beam patterns BPs (BP1 and BP2) in different directions. For example, in the third mode, the first antennal 110 and the second antenna 120 form beam patterns BPs (BP1 and BP2)

in different directions. In the third mode, the half power beam widths of the first antenna 110 and the second antenna 120 are 60° to 65° and are formed adjacent to each other in the X axis direction.

Accordingly, in the third mode, the first antenna array 111 and the second antenna array 121 disposed horizontally may transmit and receive signals to different sectors, respectively. Unlike the second mode, a 1× diversity may be realized with two sectors instead of realizing a 2× diversity.

Figures 6A, 6B:
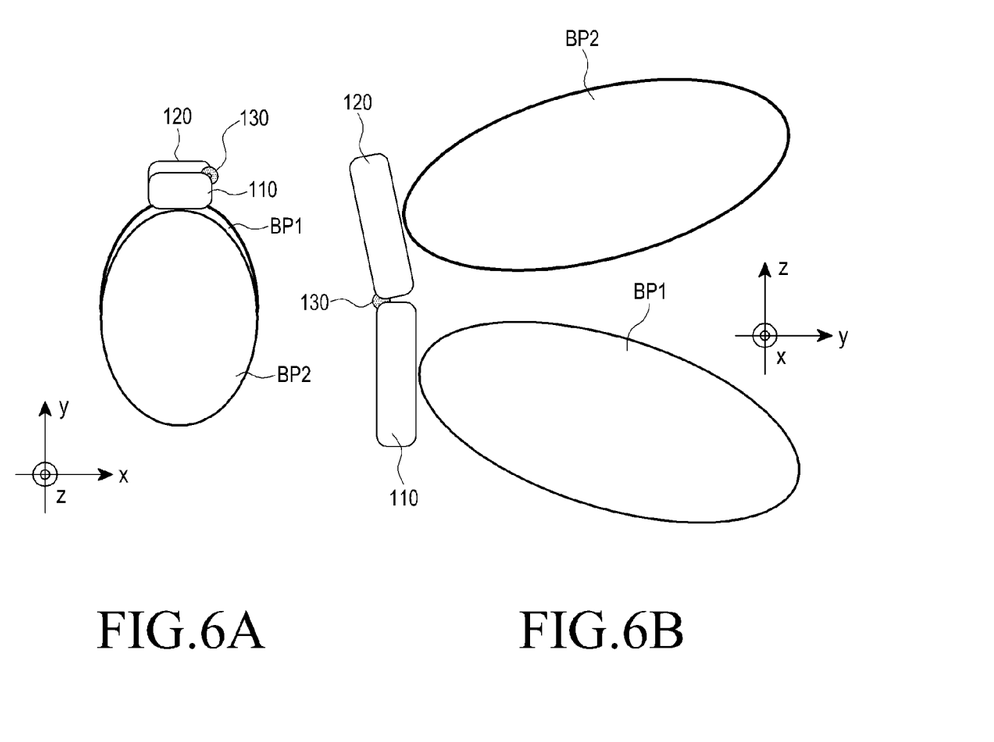
FIGS. 6A and 6B are diagrams schematically illustrating a beam pattern of a fourth mode of an adaptive antenna apparatus for a base station according to various embodiments of the present disclosure.

FIGS. 6A and 6B are diagrams schematically illustrating a beam pattern of a fourth mode of an adaptive antenna apparatus for a base station according to various embodiments of the present disclosure.

Referring to FIGS. 6A and 6B, the fourth mode corresponds to a vertical bending mode, and as in the first mode, while the first antenna 110 and the second antenna 120 are disposed, the second antenna 120 are rotated with respect to the first antenna 110 while taking the X axis as a rotation axis to be tilted with respect to the first antenna 110 in the fourth mode. Specifically, the second antenna 120 is rotated towards a front surface or a rear surface of the first antenna 110 while taking the X axis as a rotation axis, while the second antenna 120 is disposed on the upper surface of the first antenna 110 such that one surface of the first antenna 110 faces one surface of the second antenna 120 at a certain angle.

Accordingly, the second antenna array 121 is arranged on the first antenna array 111, and the second antenna 120 is tilted by an angle by which the second antenna 120 is bent with respect to the first antenna 110. As the adaptable antenna apparatus 100 for a base station arranged in the third mode, because the adaptable antenna apparatus 100 for a base station arranged in the fourth mode is configured such that the first antenna 110 and the second antenna 120 are tilted with respect to each other by a certain angle, the first antenna array 111 and the second antenna array 121 form beam patterns BPs in different directions. For example, while beam patterns BPs are formed in opposite directions with respect to the hinge 130 in the third mode, different beam patterns BPs are formed upwards and downwards with respect to the hinge 130 in the fourth mode. In the fourth mode, the half power beam widths of the first antenna 110 and the second antenna 120 are 60° to 65°, and the beam pattern BP of the first antenna 110 and the beam pattern BP of the second antenna are formed adjacent to each other in the Z axis direction.

Accordingly, if the adaptable antenna apparatus 100 for a base state is arranged in the fourth mode, signals can be transmitted and received to and from different sections in the gravitational direction.

Figure 7:
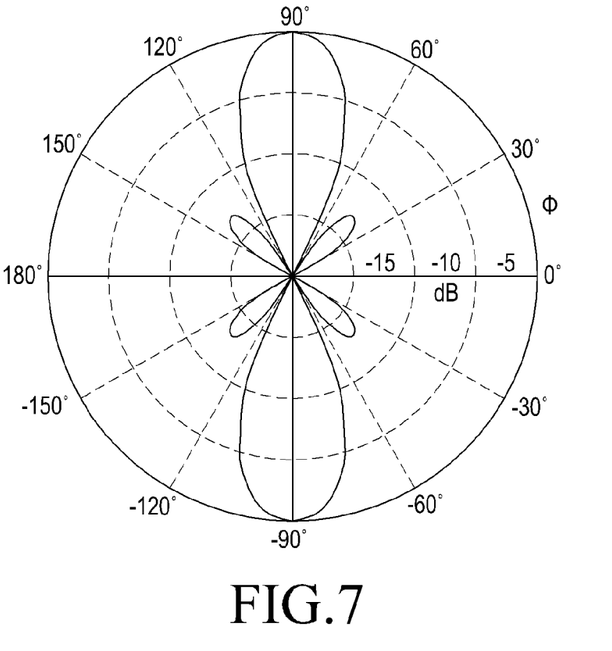
FIG. 7 is a diagram illustrating a beam pattern when first and second antennas including four antenna elements, respectively, are all driven in an adaptive antenna apparatus for a base station according to an embodiment of the present disclosure.
Figure 8:
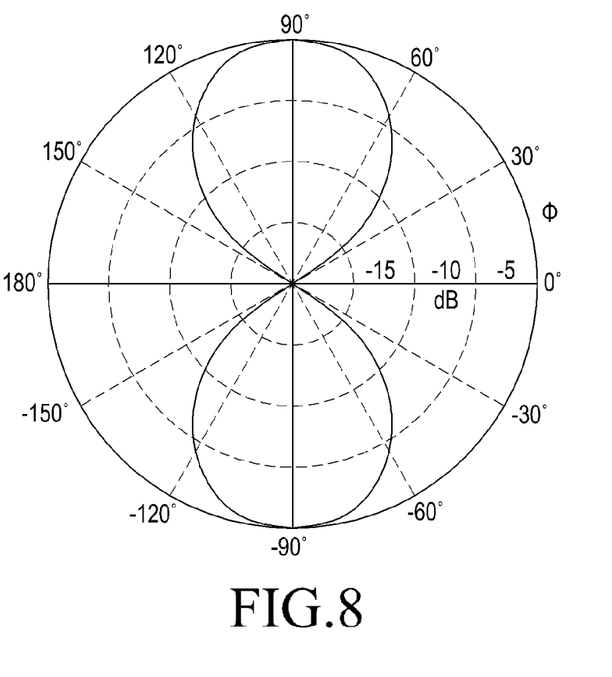
FIG. 8 is a diagram illustrating a beam pattern when only one of first and second antennas including four antenna elements, respectively, is driven in an adaptive antenna apparatus for a base station according to an embodiment of the present disclosure.

FIG. 7 is a diagram illustrating a beam pattern when first and second antennas including four antenna elements, respectively are all driven in an adaptive antenna apparatus for a base station according to an embodiment of the present disclosure. FIG. 8 is a diagram illustrating a beam pattern when only one of first and second antennas including four antenna elements, respectively is driven in an adaptive antenna apparatus for a base station according to an embodiment of the present disclosure.

Referring to FIGS. 7 and 8, the shape of the beam pattern when four pairs of antenna elements are provided such that eight columns are formed may be compared with the shape of the beam pattern when four antenna elements form one column such that two rows are formed. For example, according to the present disclosure, antenna elements are arranged in a row as in the first mode in order to form a beam pattern to a relatively remote distance, and when a beam pattern is formed in a relatively wide space while the beam pattern is formed at a shorter distance than the first mode, four pairs of antenna elements may form one column as in the second, third, and fourth modes.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An adaptable antenna apparatus for a base station, the adaptable antenna apparatus comprising:
    a first antenna having a first antenna array, the first antenna including a first transceiver module for transmitting and receiving signals and a first Field Programmable Gate Array (FPGA) for processing transmitted or received signals of the first transmission module;
    a second antenna rotatably coupled to the first antenna and having a second antenna array, the second antenna including a second transceiver module for transmitting and receiving signals and a second FPGA for processing transmitted or received signals of the second transmission module; and
    a main controller inside one of the first antenna and the second antenna,
    wherein the main controller is configured to apply a control signal to the first antenna and the second antenna,
    wherein the main controller is further configured to drive only one of the first antenna and the second antenna according to the environmental situation of the adaptable antenna apparatus, and
    wherein the main controller connects the first FPGA and connects the second FPGA.

2. The adaptable antenna apparatus of claim 1,
    wherein the first antenna is provided with the first power source for driving the first antenna,
    wherein the second antenna is provided with the second power source for driving the second antenna, and
    wherein the main controller is further configured to control the driving of the first power source and the second power source.

3. The adaptable antenna apparatus of claim 2, wherein the main controller is further configured:
    to drive both of the first antenna and the second antenna by applying electric power to both of the first power source and the second power source, or
    to drive only one of the first antenna and the second antenna by applying electric power only to one of the first power source and the second power source according to settings.

4. The adaptable antenna apparatus of claim 1,
    wherein the second antenna is disposed lengthwise on the first antenna in a gravitational direction in a first mode, and
    wherein the second antenna array is disposed in series above the first antenna array in the first mode.

5. The adaptable antenna apparatus of claim 4, wherein the first mode corresponds to a state in which the first antenna and the second antenna are unfolded.

6. The adaptable antenna apparatus of claim 4,
    wherein one beam pattern is formed with reference to a coupling surface between an upper surface of the first antenna and a lower surface of the second antenna in the first mode, and wherein a half power beam width is 30° to 35° in the first mode.

7. The adaptable antenna apparatus of claim 1,
wherein the second antenna is rotated with respect to the first antenna such that a side surface of the first antenna is folded to be adjacent to a side surface of the second antenna in a second mode, and
wherein the second antenna array is adjacent to a side surface of the first antenna array in the second mode such that the first antenna array and the second antenna array are disposed in parallel adjacently to each other.

8. The adaptable antenna apparatus of claim 7, wherein the second mode corresponds to a state in which the first antenna and the second antenna are folded.

9. The adaptable antenna apparatus of claim 7,
wherein one beam pattern is formed with respect to a coupling surface between an upper surface of the first antenna and a lower surface of the second antenna in the second mode, and
wherein a half power beam width of the second mode is 60° to 65° in the first mode.

10. The adaptable antenna apparatus of claim 1,
wherein the second antenna is primarily rotated with respect to the first antenna such that one side surface of the second antenna is folded onto one side surface of the first antenna and the first antenna and the second antenna are secondarily rotated while taking the folded side surfaces of the first antenna and the second antenna as a rotation axis such that one surface of the first antenna and one surface of the second antenna is tilted with respect to the rotation axis by a certain angle in a third mode, and
wherein the second antenna array is disposed in parallel adjacently to the first antenna array to face the first antenna at a certain angle in the third mode.

11. The adaptable antenna apparatus of claim 10, wherein the third mode corresponds to a horizontal bending mode, the first antenna in the second mode being tilted to form a certain angle from the second antenna in the third mode.

12. The adaptable antenna apparatus of claim 10,
wherein the first antenna and the second antenna form beam patterns in different directions in the third mode, and
wherein the half power beam widths of the first antenna and the second antenna are 60° to 65° such that the first antenna and the second antenna are adjacent to each other in the third mode.

13. The adaptable antenna apparatus of claim 1,
wherein the second antenna is rotated towards a front surface or a rear surface of the first antenna while the second antenna is disposed on the first antenna such that one surface of the first antenna faces one surface of the second antenna at a certain angle in a fourth mode, and
wherein the second antenna array is disposed above the first antenna array while forming a certain angle therebetween in the fourth mode.

14. The adaptable antenna apparatus of claim 13, wherein the fourth mode corresponds to a vertical bending mode, and while the first antenna and the second antenna are disposed, the second antenna being rotated with respect to the first antenna while taking the X axis as a rotation axis to be tilted with respect to the first antenna in the fourth mode.

15. The adaptable antenna apparatus of claim 13,
wherein the first antenna and the second antenna form beam patterns in different directions in the fourth mode, and
wherein the half power beam widths of the first antenna and the second antenna are 60° to 65° such that the first antenna and the second antenna are formed upward and downwards with respect to each other in the fourth mode.

* * * * *